Dec. 12, 1950

C. W. DANN ET AL 2,533,359

TRANSDUCER CARRIAGE FEED AND
CONTROL MECHANISM THEREFOR

Filed March 12, 1948

Inventor
Charles W. Dann
Richard M. Somers

Henry Lanahan
Attorney

Patented Dec. 12, 1950

2,533,359

UNITED STATES PATENT OFFICE 2,533,359

TRANSDUCER CARRIAGE FEED AND CONTROL MECHANISM THEREFOR

Charles W. Dann, Malden, Mass., and Richard M. Somers, West Orange, N. J., assignors to Thomas A. Edison, Incorporated, West Orange, N. J., a corporation of New Jersey Application March 12, 1948, Serial No. 14,506

8 Claims. (Cl. 274—13)

1

This invention relates to machines for recording and/or reproducing dictation and particularly it relates to such machines of the disk-record type although it is not limited thereto in all respects.

Certain features of the invention, hereinafter particularly pointed out, are not claimed herein but are claimed in our divisional applications Serial No. 157,146 filed April 20, 1950 and Serial No. 158,202 filed April 21, 1950.

A general object of our invention is to provide an improved drive and control mechanism for a dictating machine.

Particular features of the invention lie in the provision of an improved mechanism for releasably coupling a phonograph carriage to a feed screw, of novel and improved means for disabling this coupling mechanism when the carriage reaches a predetermined point in its forward travel, of improved mechanism for effecting a limited movement of the carriage as an incident to placing the phonographic translating means into effective condition, of novel and improved control apparatus for selectively conditioning the translating means, and of novel and improved means for defining automatically a position of farthest advance reached by the recorder prior to a backspacing thereof.

Other objects are to provide an improved dictating machine of the disk-record type which is easier to operate and control than prior such machines in the art.

Another object is to provide such a machine which is safeguarded against possible misoperation.

Another object is to provide a fully-enclosed such machine which is adapted to require a minimum number of manipulations thereon to control fully the machine and which enables the operator to be aware at all times of the condition of the machine as to adjustments, extent of recordation of the record, etc.

A further object is to provide an operating mechanism for a disk-record type of dictating machine which enables highly-accurate control of the machine.

These and other objects and features of our invention will be apparent from the following description and the appended claims.

In the description of our invention reference is had to the accompanying drawings, of which:

Figure 2 is a fractional front elevational view

2 of this dictating machine with parts in section on the line 2—2 of Figure 3;

Figure 1:
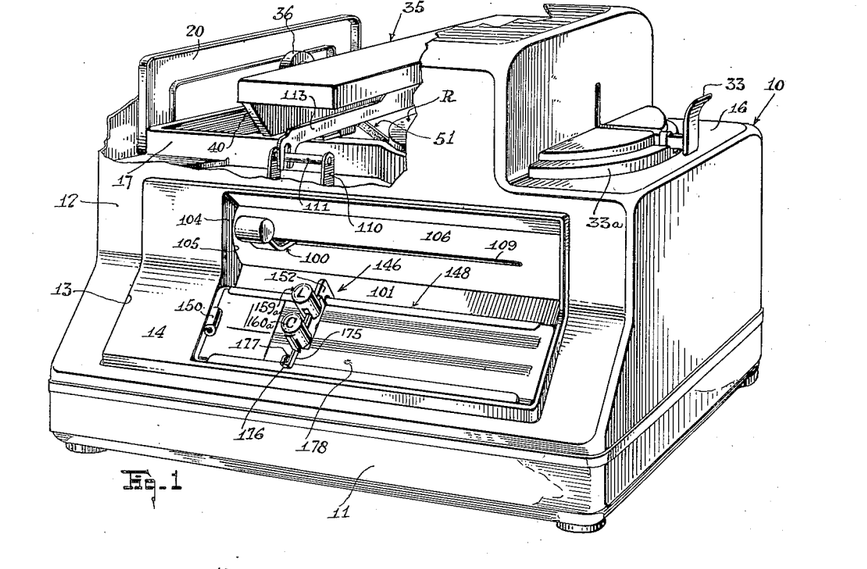
Figure 1 is a perspective view, with parts broken away, of a dictating machine according to our invention.
Figures 4, 5, 6, 7, 8:
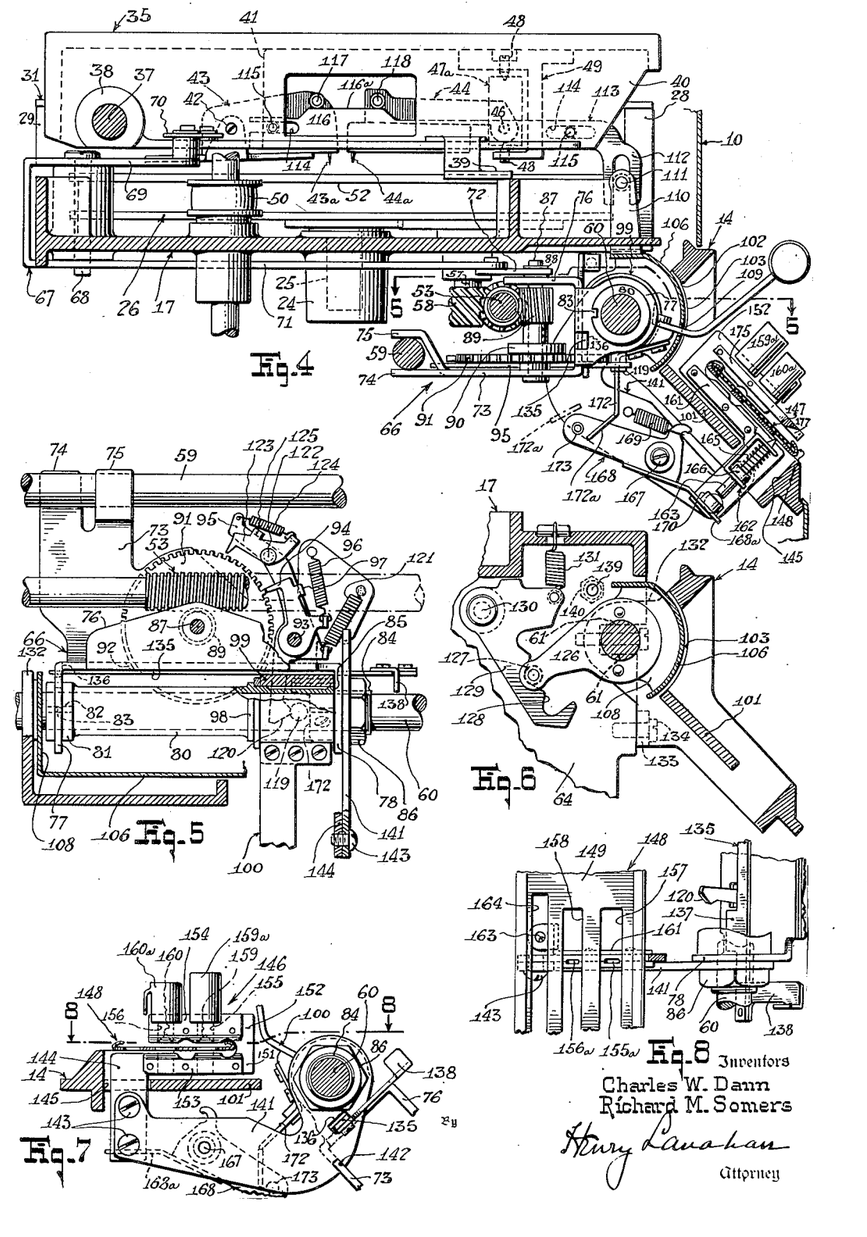
Figure 4 is a fractional vertical section taken substantially on the line 4—4 of Figure 3.
Figure 5 is a fractional horizontal section taken substantially on the line 5—5 of Figure 4.
Figure 6 is a fractional vertical section taken substantially on the line 6—6 of Figure 3.
Figure 7 is a partial right-hand elevation with parts in section on the line 7—7 of Figure 3.
Figure 8 is a partial view of the mechanism of Figure 7 as seen from the line 8—8 of that figure.

In the accompanying figures, there is shown a preferred embodiment of a dictating machine according to our invention, which is of the disk-record type. This machine has a housing 10 provided with a rectangular base 11. The housing has a front wall 12 a lower portion of which slopes downwardly and forwardly; in this front wall there is a large opening 13 to expose a transverse section 14 of the frame of the machine (Figures 1 and 4). At its right end the housing has an extending portion of reduced height providing a horizontal platform 16 to permit access for mounting a record on and removing the same from the machine.

Figure 2:
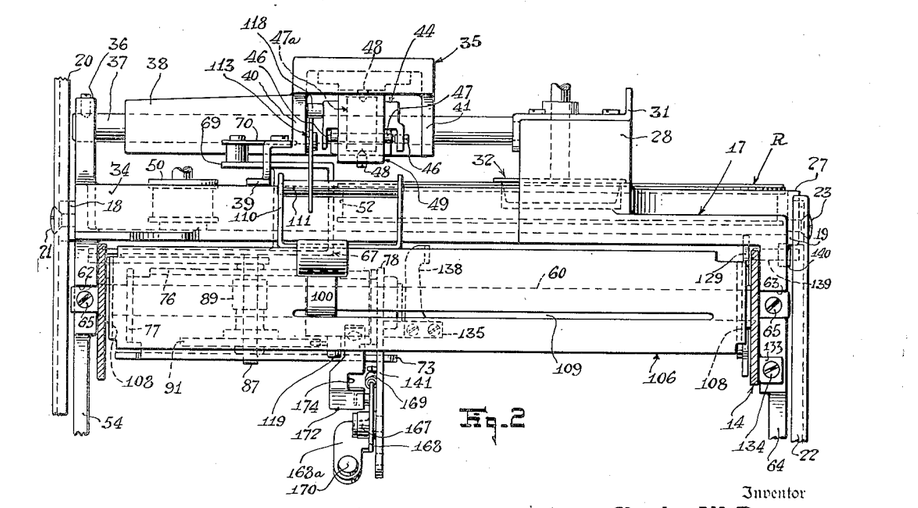
Figure 3:
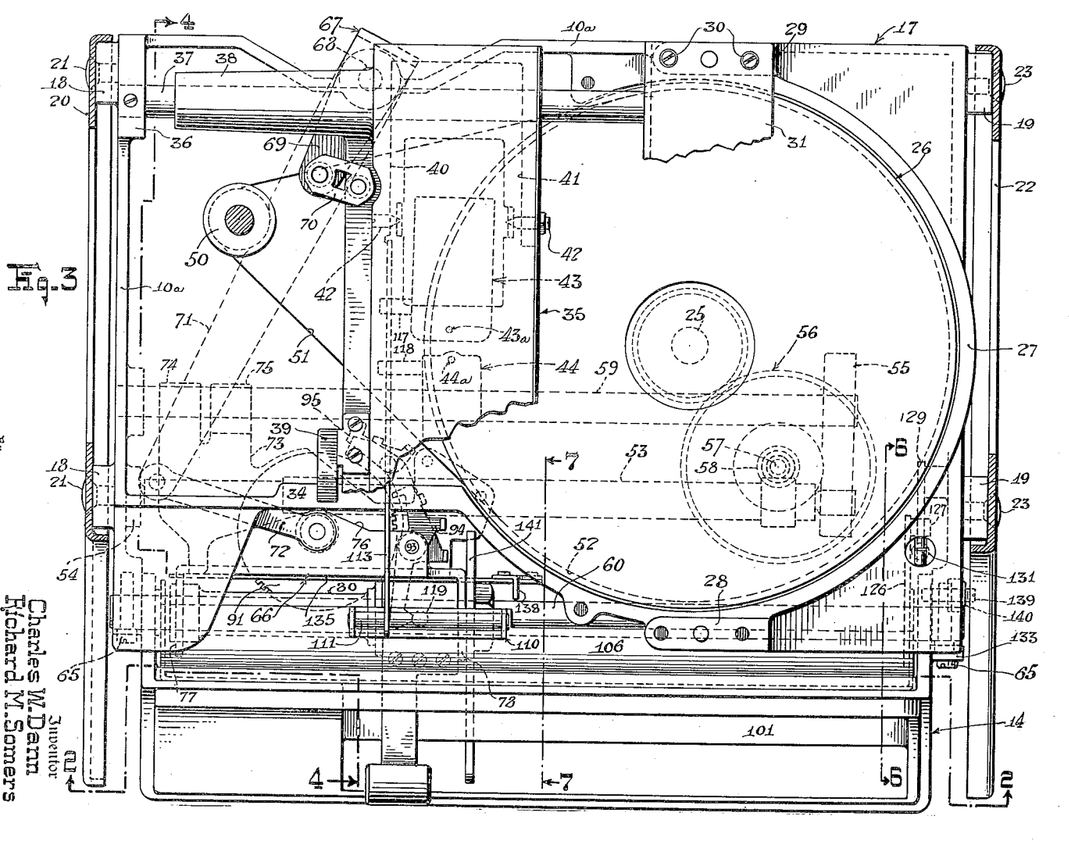
Figure 3 is a partial top plan view of this machine less the housing and with the top part of the frame and parts of the operating mechanism broken away.

The frame of the machine comprises a horizontal top plate 17 provided with pairs 18 and 19 of laterally-projecting bosses at its left and right sides respectively (Figures 2 and 3). The left pair of bosses engage an upstanding channeled frame member 20 and are secured thereto by screws 21. Likewise, the right pair of bosses engage an upstanding channeled frame member 22 and are secured thereto by screws 23. The left one of these channeled frame members extends from the base 11 to the full height of the housing, but the right one extends only from the base to the level of the platform 16. Both channeled frame members, however, have forwardly-sloping front portions (Figure 3) to conform to the front wall 12.

The top plate 17 is provided with a bearing 24 in its central right-hand portion (Figure 4) in which there is journalled a depending shaft 25 of a turntable 26. Surrounding the right half of this turntable is an arcuate flange 27 standing up from the top plate to a level just short of the top face of the turntable (Figure 2). In diametrically-opposite relation to the turntable are front and back standards 28 and 29 on the top plate 17 (Figure 3). Mounted on these standards, and secured thereto by screws 30, is a channeled member 31 (Figures 2 and 3) which bridges the turntable from front to back. This channeled member 31 carries a record-clamping mechanism 32 fractionally shown in Figure 2 and operable by a handle 33 shown in Figure 1. This clamping mechanism forms no part of the present invention and need not be herein described, but a detailed description thereof may be had by reference to the pending sole application of Charles W. Dann, one of the joint applicants of the present application, Serial No. 780,036, filed October 15 1947 and entitled Phonograph, now Patent No. 2,524,561, issued October 3, 1950.

The right-hand portion of the turntable is exposed to enable easy mounting and removal of a record thereon and therefrom. However, this right-hand portion is normally covered by a shallow arcuate cover 33a. The cover is hinged to the housing and is raised to an open position as the handle 33 is raised to release the record-clamping mechanism. This part of the machine, however, need not be herein described in detail since the same is the subject of a pending sole application of Richard M. Somers, one of the joint applicants of the present application, Serial No. 773,129, filed September 10, 1947 and entitled Closure for Phonograph.

The arcuate flange 27 extends a distance to the left of the front standard 28 and then leads into a transverse rectilinear guide rail 34 for slidably supporting the forward end of a carriage 35. An upstanding flange 18a on the top plate extends from the left end of the guide rail, along the left and rearward sides of the machine, to the back standard 29. At the rear of the top plate between a standard 36 at the left corner thereof and the channeled frame member 31 there is a transverse rod 37. The carriage 35 has a long bearing 38 at its rearward end which is slidably mounted on this rod. At the forward end of the carriage there is a depending foot 39 (Figures 3 and 4) which rests slidably on the guide rail 34. Thus, the carriage 35 is mounted for back-and-forth transverse traveling movement across the central portion of the top plate 17.

The carriage 35 comprises a top wall having a depending flange 40 along the full length thereof at its left side and having a similar such flange 41 at its right side but along only the rearward portion thereof. In these flanges there are cone pivots 42 pivotally supporting a recording-type translating device 43—otherwise herein sometimes referred to simply as a recorder. This recorder 43 has a recording stylus 43a at its forward end for engagement with a record R on the turntable. To the front of the recorder there is a reproducing-type translating device 44—otherwise herein sometimes referred to simply as a reproducer—which has a reproducing stylus 44a at its rearward end. This reproducer has a pair of cone pivots 46 at its forward end which pivotally engage the ends of a transverse rod 47 (Figure 2) carried by a vertical cylinder 47a. This cylinder is journaled at its axis on two cone pivots 48 carried by a U-shaped standard 49 mounted on the under side of the carriage shown in Figure 4. Thus, the reproducer is mounted universally for both up and down transverse movement of its stylus relative to a mounted record R.

The drive mechanism for turning the turntable and effecting a traveling movement of the carriage 35 comprises a motor (not shown) having a drive pulley 50 journaled in the top plate 17. This drive pulley is coupled directly to the turntable by a belt 51 which rides in a groove 52 provided in the periphery of the turntable. The carriage is driven by the turntable through a mechanism comprising a transverse feed screw 53 journaled at its ends on two cone pivots carried by respective standards 54 and 55 depending from the top plate. The shaft 25 of the turntable is coupled by a gear train 56 (Figure 3) to a vertical shaft 57 journaled in the top plate, and the latter shaft is coupled by spiral gearing 58 (Figures 3 and 4) to the feed screw so that the feed screw is turned whenever the turntable is turned. At the back side of the feed screw and in parallel relation thereto is a rod 59 fixedly held at its ends in the standards 54 and 55, and at the front side of the feed screw there is a similar rod 60 having end portions with diametrically opposite flats 61 of which the left end portion seats in a rectangular recess 62 provided in the standard 54 and the right end portion seats in a rectangular recess 63 provided in a depending standard 64 at the right end of the top plate, both end portions being held in place by screws 65 as shown particularly for the right end portion in Figure 6. These rods 59 and 60 lie below the top plate 17 and have slidably mounted thereon a carriage 66 (Figures 4 and 5) which is moved progressively along the rods by the feed screw 53 as is hereinafter described in detail. This carriage 66 serves particularly as a traveling support for certain controls of the machine hereinafter described.

Coupled to the carriage 66 is the carriage 35 for the recorder and reproducer. The coupling means between these carriages is claimed in our divisional application Serial No. 157,202 aforementioned. This coupling means comprises a lever 67 (Figures 3 and 4) pivoted at 68 to the rearward portion of the top plate. This lever 67 has a short horizontal lever arm 69 above the top plate coupled by a short link 70 to the carriage 35 and has a relatively long horizontal lever arm 71 below the top plate coupled by a link 72 to the carriage 66, the links being pivoted at their ends to the respective lever arms and carriages. Certain features of this coupling are (1) that the pivot axes of the respective links lie in planes which are parallel to one another in all positions of the carriage, and (2) the links have lengths proportional to the distances of their respective pivots on the lever 67 from the pivot axis of that lever on the top plate 10. As a result, the angles between the links and respective lever arms vary alike as the carriage 66 is moved through its range of travel to cause the carriage 35 to be driven in absolute correspondence with the movement of the carriage 66 but at a less rate by the ratio of the lengths of the lever arms 69 and 71. This lever and link arrangement between the carriages thus constitutes a particularly simple form of a linear-transmission coupling between these elements.

The carriage 66 comprises a lower horizontal plate 73 having two rearwardly-extending fingers 74 and 75 offset vertically from each other and embracing slidably the rod 59. At the front the plate 73 is bent upwardly and then rearwardly to provide the carriage with a top flange 76 overhanging a portion of the bottom plate 73. The vertical portion of the carriage between the bottom plate and top flange has forwardly-extending lugs 77 and 78 at its left and right ends. These lugs are apertured to receive a sleeve 80 which is mounted slidably on the cross rod 60. The sleeve has a collar 81 at its left end provided with a groove 82 lengthwise of the sleeve. The left lug 77 embraces this collar and has an inwardly-projecting key 83 which engages this groove so as to lock the sleeve against turning relative to the carriage. The right lug 78 embraces a reduced-diameter end portion 84 of the sleeve and is clamped tightly against a shoulder 85, at the inner end of the portion 84, by a nut 86 threaded on this right end portion. Thus the carriage is secured firmly to the sleeve 80 and is mounted for free back-and-forth traveling movement along the rods 59 and 60.

The bottom plate 73 and top flange 76 of the carriage 66 are bridged by a vertical pin 87. (It is to the upper end of this pin that one end of the link 72 is pivoted, the link being held thereon as by a spring clip 88.) On this pin 87 between the flange 76 and bottom plate 73 there is journalled a circular feed nut 89 which engages continuously the feed screw 53. This feed nut has a depending shank provided with a collar 90 to which there is staked a gear 91. This is a relatively large gear which projects through a slot 92 in the forward wall of the carriage 66 (Figure 5). On the top side of plate 73 to the right of this gear there is a stud 93 on which there is pivoted a latching pawl 94. Pivoted also on this stud is a rock lever 95 for operating this pawl. The pawl is urged by a tension spring 96 towards the gear 91 but has a stop lug 97 at the back side of the rock lever 95 so that the pawl cannot engage the gear 91 unless the rock lever is in a released condition as will hereinafter appear. When the latching pawl is in engagement with the gear the feed nut 89 is locked in relation to the carriage so that the carriage is driven along the rods 59 and 60 as the feed screw is turned.

The sleeve 80 has a collar 98 intermediate its ends to provide a localized bearing between it and the lug 78 for a hub 99 of a manually-operable control lever, or hand lever, generally referred to as 100. This control lever projects forwardly through the opening 13 from the housing 10. Among other functions the control lever serves as a means for manually moving the carriage 66 along the rods 59 and 60 and for thereby also moving the carriage 35 to effect a traveling movement of the recorder and reproducer across a mounted record R. Other functions of the hand lever 100 (1) to control the conditioning of the recorder and reproducer in relation to a mounted record, (2) to control the locking of the feed nut 89, (3) to effect a predetermined advance of the recorder and reproducer across the record when either is shifted from neutral to effective condition, and (4) to operate a means to indicate the position of farthest advance of the recorder when the recorder is taken out of recording condition. The ways in which these functions are carried out are hereinafter described in detail.

The transverse frame member 14 has rearwardly-extending apertured ears 132 at its left and right ends through which passes snugly the rod 60. At the right end of this frame member there is a lug 133 secured by a screw 134 to the front face of the depending standard 64. Thus, the frame member 14 is held in fixed relation to the top plate 10.

Extending throughout a major portion of the length of the frame member 14 is an inset wall 101 which is parallel with the lower forwardly-inclined portion of the frame member and disposed about midway the height of the frame member. Above this wall and throughout the length thereof there is an opening 102 in the frame member which is to the front of the rod 60. At the right end of this opening there is in the interior side of the frame member a recess bounded at the front by an edge 103 which is arcuate about the rod 60. At the left end of this opening there is an inwardly-extending flange 104 terminating in an arc 105 about the rod 60. Along the length of the rod 60 and to the front thereof there is a closure 106 which is arcuate in cross section to conform to the edges 103 and 105 and to close substantially the opening 102. This closure has rearwardly-extending apertured ears 108 at its ends which pivot on the end portions of the rod 60. There is in this closure throughout the length of travel of the hand lever 100 a clearance slot 109 for this lever. The lever extends through this slot to have a splined connection with the closure 106. Thus, the hand lever is free to move with the carriage 66 along the full length of travel of the latter but as the hand lever is rocked upwardly and downwardly on the sleeve 80 the closure 106 is rocked therewith on the rod 60.

Secured as by welding to a top portion of the closure 106 is an upstanding U-member 110 (Figures 2 and 3) which is bridged by a transverse rod 111. This rod is embraced slidably by a depending bifurcated arm 112 provided at the front end of a slide 113 which is mounted on the right side of the flange 40 of the carriage 35. The slide has two slots 114 lengthwise thereof through which pass headed mounting screws 115 that thread into the flange 40 to provide the slide with a forward-and-backward freedom of movement. The rod 111 is made at least as long as the length of travel of the carriage 35 so that the carriage is free to move throughout its path of travel, it being understood that the arm 112 slides along the rod 111 as the carriage is so moved. The slide 113 has an upwardly-extending cam 116 near its rearward end which is provided with a central dwell 116a. Extending leftwardly from the free ends of the recorder 43 and reproducer 44 are respective lift fingers 117 and 118 which overlie this cam. When the hand lever 100 is in a central or neutral position—the position it occupies in Figure 4—both lift fingers rest on the dwell 116a and hold the respective styli 43a and 44a at a clearance distance above a mounted record R. As the hand lever 100 is moved downwardly from neutral position into a "recording" position, the slide 113 is moved forwardly to move the cam 116 ahead of the finger 117 and thus allow the recorder stylus to engage the record under the influence of a suitable downward biasing of the recorder, but the other finger remains yet on the dwell 116a to hold the reproducer stylus at a clearance distance above the record. As the hand lever 100 is moved upwardly through neutral position into a "reproducing" position, the cam 116 first moves under the finger 117 to raise the recorder from the record and then moves to the rear of the finger 118 to allow the reproducer to engage the record under the influence of the downward bias of this unit. Thus, the hand lever 100 is selectively operable to place either the recorder or reproducer into engagement with the record. Moreover, by reason of the slidable coupling between the slide 113 and closure 106 and the above described spline connection between the hand lever and the closure, both the hand lever 100 and carriage 35 are free to move at their different rates while maintaining operative coupling of the hand lever to the recorder and reproducer.

The mechanism above described for controlling the conditioning of the recorder 43 and reproducer 44 by the hand lever 100 is not claimed herein but is claimed in our divisional application Serial No. 157,202 aforementioned.

Depending from the hub 99 of the hand lever is a pin 119 which lies to the right of a forwardly-extending arm of the rock lever 95. On the forward end portion of this rock lever there is a cam 120 the tip of which engages the pin 119 when the hand lever is in neutral position to hold the rock lever 95 in a clockwise position against the bias force of a tension spring 121 and maintain the latching pawl 94 out of engagement with the gear 91. Thus, when the hand lever is in neutral position, the feed nut 89 is freely rotatable on the carriage 66 to permit the carriage to be moved manually along the rods 59 and 60. However, as the hand lever 100 is moved from neutral position into either a recording or a reproducing position, the pin 119 is moved free of the cam 120 and the latching pawl 94 is then moved under the influence of its bias into engagement with the gear 91 to lock the feed nut. Thus when the hand lever is in a recording or reproducing position the carriage 66 is coupled to the feed screw to cause the recorder or reproducer to be moved progressively across the record R as the turntable is rotated.

The rock lever 95 has a rearward extension carrying a pivot stud 122 on which there is pivoted a pawl 123. This pawl is urged counter-clockwise by a tension spring 124 into a position defined by engagement of a stop lug 125 of the pawl against the rock lever (Figure 5). Since this pawl 123 is carried at a distance from the pivot center 93 of the rock lever, it has a much greater range of movement than has the latching pawl. When the latching pawl is held disengaged by the abutment of the cam 120 against the pin 119, the tooth of the pawl 123 is at just a suitable clearance distance from the gear 91. As the rock lever is released the pawl 123 immediately engages the gear 91. Since the tooth of the pawl 123 is offset considerably to the left of a line drawn from the axis 122 to the pivot axis 93 of the rock lever, and positioned ahead of the pivot axis 122 as with respect to the axis 93, the initial movement of the rock lever after the pawl 123 engages the gear 91 is effective to produce a definite counterclockwise movement of the gear before the latching pawl comes into engagement therewith. The amount of this movement will vary depending upon whether the pawl 123 first engages a tooth or a space between two successive teeth of the gear wheel 91, but in any case it is adapted to bring the gear into a position in relation to the latching pawl so that this latter pawl will engage a space between two successive teeth of the gear wheel and positively lock the feed nut. This counterclockwise turning of the gear 91 incidental to placing the recorder or reproducer into effective condition is adapted to effect an advance of the two translating devices across the record. This is done so that if an operator turns the hand lever 100 to neutral position and then restores it to recording position the recording stylus will be advanced a definite amount to prevent possible engagement of the stylus with the portion of the record already recorded on. The minimum such advance—which is that effective when the pawl 123 first engages the most clockwise end of a tooth of the gear 91—is typically one providing a traveling movement of the carriage 35 through the distance of the width of several groove convolutions in the record.

In order to define definitely the neutral, recording and reproducing positions of the hand lever 100, a detent means effective on the closure 106 is provided at the right end of the latter as shown in Figures 3 and 6. This detent means comprises a rearwardly-extending arm 126 riveted to the right ear 108 of the closure 106. Journalled to the rearward end of this arm is a roller 127 and engaging this roller is a serrated edge 128 of a lever 129 pivoted at 130 to the depending standard 64 and urged by a spring 131 against the roller. The serrated edge is disposed generally on an arc about the center of the shaft 60 and has three notches to define the respective positions of the hand lever. In the positioning of the parts shown in Figure 6 the roller engages the center one of these notches to detent the lever in its neutral position. Similarly, the upper and lower notches serve to detent the hand lever in its recording and reproducing positions respectively as the hand lever is moved to those positions.

The forward driven movement of the translating devices across the record is limited by a means for disabling automatically the drive mechanism for the carriage 66 as this carriage nears the end of its forward travel. This means comprises a slide bar 135 which spans the space between the lugs 77 and 78 of the carriage 66 and which is mounted slidably in slots 136 provided in these lugs (Figures 5, 7 and 8). This bar has a depending finger 137 to the right of the forward arm of the rock lever 95 so that when the slide is moved leftwardly this finger will engage the rock lever and turn it to disengage the latching pawl 94 from the gear 91. This leftward movement of the slide is effected by abutment of an offset right end portion 138 thereof against a stationary pin 139 in the standard 64 as the carriage 66 is moved into the end portion of its forward travel. To permit adjustment of the position whereat the slide is moved sufficiently to disable the carriage drive mechanism, the pin 139 is threaded into the standard 64 and provided with a head accessible to the right of the frame of the machine, the pin being held in its adjusted position by a lock nut 140 which is threaded thereon against the standard 64.

Clamped to the carriage 66 and sleeve 80, between the lug 78 and nut 86, is an arm 141 which depends first below the rod 60 and then extends forwardly below the transverse frame member 14 in parallel relation to the inset wall 101 (Figures 4, 5 and 7). This arm has a notch 142 engaged in interlocking relation with a portion of the bottom plate 73 of the carriage 66 to hold the arm from turning about the rod 60. Secured by screws 143 to the forward end of this arm is an upstanding member 144 which extends through an opening 145 in the transverse frame member 14, this opening being to the front of the wall 101 and extending along the length of the path of traveling movement of the carriage 66. The member 144 carries a punch and die assembly, generally referred to as 146, which is of the character described and claimed in the Gramann Patent No. 2,184,914 issued December 26, 1939. By means of this assembly annotations for the purpose hereinafter explained are made on an index slip 147 carried by a holder 148 that over-lies the opening 145 and inset wall 101 of the frame member 14, the holder being suitably mounted at its ends on the wall 101 by means not herein necessary to show. The holder is of a form common in the art and comprises a flat plate 149 having top and bottom edges folded back on itself to provide a channel open at the right end of the plate to receive slidably the index slip 147, there being a pressure roller 150 at the left end of the holder to frictionally hold the slip in mounted position.

The punch and die assembly comprises a vertical die member 151 which is integral with the member 144 and extends upwardly across the bottom of the holder 148 beyond the upper edge thereof. Overlying the holder 148, and in the plane of the die member 151 is a punch-holding member 152 joined integrally with the die member at the upper edge of the holder. Riveted to the die- and punch-holding members are respective plates 153 and 154. Extending through the punch-holding member 152 and respective plate 154 are two apertures 155 and 156 rectangular in cross section. Similarly, extending through the die member 151 and respective plate 153 are two apertures 155a and 156a aligned with the apertures 155 and 156 respectively and also rectangular in cross section. To provide clearance between the pairs of apertures 155—155a and 156—156a, in all positions of the carriage 66, there are provided respective slots 157 and 158 in the holder 148. Slidably mounted in the upper apertures 155 and 156 are respective punches 159 and 160 having slotted caps 159a and 160a at their upper ends which embrace the members 152—154. The punches are urged upwardly by suitable spring means not shown and the caps serve as finger pieces by which the respective punches may be depressed to engage the slip 147 and then pass through the respective slots 157 and 158 and enter the respective apertures in the die members to punch narrow rectangular openings in the slip. Since the punch and die assembly is carried by the carriage 66 it is moved longitudinally along the index slip in accordance with the traveling movement of the translating devices relative to the record R. Typically, one punch is used to indicate lengths of separate items of dictation and the other is used to indicate places whereat errors and/or corrections are or have been made.

A device, herein next described for indicating positions of farthest advance of the recorder, is not claimed herein but is claimed in our divisional application Serial No. 157,146 aforementioned. This device comprises a bracket 161 riveted to the die member 151 and terminating in a U-member 162 that lies in the opening 145 of the frame member 14. This U-member has upper and lower legs apertured to provide two spaced bearings for a pin 163 which has the upper end thereof pointed to impale the index slip from the under side, there being a clearance slot 164 for the pin in the holder 148 along the length of the latter. This impaling pin is controlled to punch holes 178 in the index slip 147 at points whereat the machine is taken out of recording condition so that the operator will have an indication, should he backspace the carriage to listen to portions of dictation already recorded, of the position of farthest advance to which the recording operation has proceeded, this being in accordance broadly with the teachings of the Somers Patent No. 2,251,173, issued July 23, 1941. The way in which the pin 163 is operated to punch the holes 178 is herein next described.

Normally, the pin 163 is held by a spring 165, that is located between the upper leg of the U-member 162 and a collar 166 on the pin, in an unoperated position defined by the abutment of the collar against the bottom leg of the U-member. Pivoted at 167 to the left side of the arm 141 is a rock lever 168 having a forwardly-extending arm 168a bent over at right angles thereto which terminates below the impaling pin, the rock lever being normally held in a neutral position by a tension spring 169 connected between it and a pin on the arm 141. On the forward end portion of the arm 168a there is a hardened piece 170 for impingement against the bottom end of the impaling pin as the lever 168 is rocked counterclockwise as it appears in Figure 4. The pin is so actuated to punch the index slip whenever the hand lever 100 is moved from recording position to neutral position by a means consisting of an arm 172 secured to the hub 99 of the hand lever and a roller 173 on the rearward end of the rock lever 168. For instance, when the hand lever is moved to recording position an inclined cam 172a on the end of the arm 172 engages the roller 173 and cams the rock lever 168 in a reverse (clockwise as it appears in Figure 4) direction until the roller rides off the upper edge of the cam through a slot 174 (Figure 2), the cam 172a then having the position relative to the roller shown by dash-dot lines in Figure 4. When the hand lever 100 is next returned to neutral position, the under side of the cam 172a engages the roller 173 and cams the rock lever in a forward direction to move the impaling pin upwardly to punch a hole 178 in the index slip, the roller 173 then moving off the under side of the cam and returning to the position relative thereto shown by their full-line positions in Figure 4.

A feature of our invention lies in the provision of a novel die and indicating member 175 in association with the position-indicating means described in the foregoing paragraph. This member 175 is riveted to the punch-carrying member 152 and extends back to front across the index slip. The forward end portion 176 of this member 175 is bent back on itself in spaced parallel relation thereto and across the back side of the member in respect of its direction of advance across the index slip. The end of this curved end portion is pointed to serve as an indicating pointer 177. The center of this curved end portion 176 is aligned with the impaling pin 163 so that it serves to back the border of the slip around the pin as the slip is punched. After the machine is taken out of recording condition, and the carriage 66 is moved manually for any purpose and is then to be restored to a suitable position to resume recording, the operator is to set the carriage at that position whereat the pointer 177 is aligned with the hole 178 which was produced when the machine was last taken out of recording condition. Since the pointer 177 is at a short distance back from the impaling pin in respect of the direction of advance of the carriage, the aligning of the pointer 177 with the hole 178 farthest along the index slip will cause the recorder stylus to be positioned a slight distance ahead of the last recorded groove convolution and thus prevent possible overlapping of the final and initial portions of successive recordations on the record.

Instead of punching or impaling the slip to make position-indicating or other annotating marks thereon, we may alternatively make suitable impressions in a slip within the scope of our invention, and it is intended in the claims that the term "punch" shall include, as equivalents, means for so making impression marks on the slip.

Since the present machine has two carriages 35 and 66 intercoupled to move correspondingly with one another although at different rates, the first carriage being to support the translating devices and the second to support the control lever 100 and associated driving mechanisms, as well as annotating and position-indicating mechanisms, we intend in the claims unless otherwise specifically defined that the term "carriage" shall refer to either of the two carriages specifically shown and described.

The embodiment of our invention herein particularly shown and described is illustrative and not necessarily limitative of our invention since the same is subject to changes and modifications without departure from the scope of our invention, which we endeavor to express according to the following claims.

We claim:

1. A drive for a carriage of a dictating machine comprising a frame; a mounting on said frame for supporting said carriage only for rectilinear traveling movement; a feed screw extending along the path of movement of said carriage; a circular feed nut journalled on said carriage and continuously engaging said feed screw; releasable locking means for holding said feed nut from turning relative to said carriage whereby a turning movement of said feed screw will produce a traveling movement of said carriage; and means operatively coupled to said locking means and operated during movement of said carriage into the end portion of its forward travel for releasing the locking means whereby to disable said drive.

2. A drive for a carriage of a dictating machine comprising a frame; a mounting on said frame for supporting said carriage only for rectilinear traveling movement; a feed screw extending along the path of movement of said carriage; a circular feed nut journalled on said carriage and continuously engaging said feed screw; releasable locking means for holding said feed nut from turning relative to said carriage whereby a turning movement of said feed screw will produce a traveling movement of said carriage; a movable member mounted on said carriage and operatively coupled to said locking means to move the latter to released position in response to a movement of the movable member in a direction reverse to that of the advance movement of the carriage; and a normally-stationary member on said frame and in the path of said movable member for causing the latter to be moved to place said locking means into released position during the movement of said carriage into the end portion of its forward travel.

3. In a dictating machine including a translating device movable into and out of effective position in relation to a moving record: the combination of a feed screw; a carriage mounted for movement along said feed screw and adapted to effect a traveling movement between said device and said record as the carriage is moved; means for coupling said carriage to said feed screw comprising a circular feed nut journalled to said carriage and engaging continuously said feed screw, and a latching pawl for locking said feed nut from turning relative to said carriage; a control lever coupled to said translating device for shifting the latter between effective and ineffective positions; and means controlled by said control lever for rendering said latching pawl effective and ineffective as said translating device is placed in effective and ineffective positions.

4. In a dictating machine including a rotatable support for a record, and a translating device: the combination of a feed screw; a carriage mounted for movement along said feed screw and adapted to effect a traveling movement between a record on said support and said device as the carriage is moved along the feed screw; a circular feed nut journalled to said carriage and engaging said feed screw; releasable means for locking said feed nut to said carriage; and means coupled to said locking means and operated as an incident to placing the latter into effective position for turning said feed nut relative to said carriage to effect a movement of said translating device across the record.

5. In a dictating machine including a rotatable support for a record, and a translating device: the combination of a feed screw; a carriage mounted for movement along said feed screw and adapted to effect a traveling movement between a record on said support and said device as the carriage is moved along the feed screw; a circular feed nut journalled to said carriage and engaging said feed screw; a toothed wheel connected to said feed nut; a latching pawl pivoted to said carriage and movable into and out of engagement with said wheel to lock and release said feed nut; and a second pawl operatively coupled to said first pawl and moved into engagement with said wheel, to effect a movement of said carriage relative to the record prior to the locking of the feed nut, as the latching pawl is moved into effective position.

6. In a dictating machine including a rotatable support for a record, and a translating device: the combination of a feed screw; a carriage mounted for movement along said feed screw and adapted to effect a traveling movement between said device and a record on said support as the carriage is moved along the feed screw; a circular feed nut journalled to said carriage and engaging said feed screw; a toothed wheel connected to said feed nut; a first pawl engageable with said wheel for locking said feed nut; a lever controlling said pawl and movable into locking and unlocking positions; and a second pawl moved by said lever into engagement with said wheel prior to the engagement of said first pawl with the wheel as the lever is moved to locking position, said second pawl being adapted to turn said wheel to effect an advance of said translating device relative to the record prior to the locking of said feed nut by said first pawl.

7. In a dictating machine: the combination of a carriage mounted for traveling movement; a record-cooperating translating means; a movably mounted hand member on said carriage coupled to said translating means and movable from neutral to record and reproduce positions to condition the translating means for recording and reproducing respectively; a feed screw for driving said carriage; a circular feed nut journaled to said carriage; a latching pawl on said carriage for said feed nut; means controlled by said hand member to hold said pawl in ineffective position when the hand member is in neutral position and to cause the pawl to be moved into effective position as the hand member is moved from neutral position into either record or reproduce positions;

and means, controlled by said hand member upon movement thereof out of neutral position and operated prior to said pawl reaching its effective position, for turning said feed nut to effect a limited advance of said carriage.

8. In a dictating machine including a rotatable support for a record, and a translating device: the combination of a feed screw; a carriage mounted for movement along said feed screw and adapted to effect a traveling movement between said device and a record on said support as the carriage is moved along the feed screw; a circular feed nut journalled to said carriage and engaging said feed screw; a toothed wheel connected to said feed nut; a latching pawl pivoted to said carriage and movable into and out of engagement with said wheel to lock and release said feed nut; and means coupled to said latching pawl and operated as the latter is moved toward said wheel for positioning said wheel to align a space between successive teeth thereof with said pawl.

CHARLES W. DANN.
RICHARD M. SOMERS.

REFERENCES CITED

The following references are of record in the file of this patent:

UNITED STATES PATENTS

| Number | Name | Date |
|---|---|---|
| 1,020,151 | McNulty | Mar. 12, 1912 |
| 1,119,157 | Hibbard | Dec. 1, 1914 |
| 1,184,332 | Edison, I | May 23, 1916 |
| 1,184,333 | Edison, II | May 23, 1916 |
| 2,008,356 | Johnson | July 16, 1935 |
| 2,260,861 | Nystrom | Oct. 28, 1941 |
| 2,265,034 | Gailmard et al. | Dec. 2, 1941 |

Certificate of Correction

Patent No. 2,533,359                                December 12, 1950

CHARLES W. DANN ET AL.

It is hereby certified that error appears in the printed specification of the above numbered patent requiring correction as follows:

Column 1, line 10, for "158,202" read *157,202*; column 5, line 53, after "100" insert *are*;

and that the said Letters Patent should be read as corrected above, so that the same may conform to the record of the case in the Patent Office.

Signed and sealed this 8th day of January, A. D. 1952.

[SEAL]

THOMAS F. MURPHY,
*Assistant Commissioner of Patents.*